United States Patent
Chen et al.

(10) Patent No.: US 7,254,586 B2
(45) Date of Patent: Aug. 7, 2007

(54) SECURE AND OPAQUE TYPE LIBRARY PROVIDING SECURE DATA PROTECTION OF VARIABLES

(75) Inventors: Yuqun Chen, Bellevue, WA (US); Ramarathnam Venkatesan, Redmond, WA (US); Mariusz H. Jakubowski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 412 days.

(21) Appl. No.: 10/185,644

(22) Filed: Jun. 28, 2002

(65) Prior Publication Data

US 2004/0003278 A1 Jan. 1, 2004

(51) Int. Cl.
*G06F 7/00* (2006.01)
*G06F 11/30* (2006.01)
*G06F 12/14* (2006.01)
*H04L 9/32* (2006.01)

(52) U.S. Cl. .......................... 707/104; 707/1; 713/190; 713/194

(58) Field of Classification Search ................ 707/104, 707/1; 713/194, 190
See application file for complete search history.

(56) References Cited

U.S. PATENT DOCUMENTS 6,594,761 B1 *  7/2003  Chow et al. ................. 713/190
6,668,325 B1 * 12/2003  Collberg et al. ............. 713/194
2003/0018608 A1 *  1/2003  Rice et al. ....................... 707/1
2003/0221121 A1 * 11/2003  Chow et al. ................. 713/200

* cited by examiner

*Primary Examiner*—Anthony Knight
*Assistant Examiner*—Sunray Chang
(74) *Attorney, Agent, or Firm*—Merchant & Gould P.C.

(57) ABSTRACT

A method, apparatus, and article of manufacture for providing secure and opaque type libraries to automatically provide secure variables within a programming module. A system for providing secure and opaque type libraries to automatically provide secure variables within a programming module. The system includes an OTL selection module, an OTL substitution module, an OTL type library database, a compiler module; and a linker module to create an executable processing module. The OTL selection module randomly selects or generates one of the possible variable obfuscation functions for each declared secure variable. The OTL substitution module substitutes the separate instance of the selected variable obfuscation function for every reference to the declared secure variable. The OTL type library database receives queries from the OTL selection module a database to identify of possible variable obfuscation functions applicable for the variable type corresponding to the declared secure variables.

28 Claims, 10 Drawing Sheets

SECURE AND OPAQUE TYPE LIBRARY PROVIDING SECURE DATA PROTECTION OF VARIABLES

TECHNICAL FIELD

The invention relates generally to a system, method and article of manufacture to provide secure variables within programming modules and more particularly to a system, method and article of manufacture for providing secure and opaque type libraries to automatically provide secure variables within a programming module.

BACKGROUND

Ever since the days of early IBM PCs and 8-bit machines, application programmers and crackers have fought a never-ending battle in the field of software protection. Creating "uncrackable" programs remains a theoretical and practical open problem, especially against skilled and talented reverse engineers who devote significant amounts of time and effort to their job. However, various techniques of obfuscation and tamper resistance can be useful depending on the models of piracy in given channels, to deter casual pirates or delay crackers who attempt to bypass security checks, attach viruses, patch code and data at runtime, and in general alter software behavior.

Developers have often treated software security as an independent feature that can be easily "plugged in" once an application is finished. Indeed, a large number of automatic "protectors" or "wrappers" are available to encrypt executables and add layers of anti-hacking code. Unfortunately, such plug-in solutions have typically proven quite breakable and ineffective, despite continuing upgrades and improvements to address hacks that appear within days or even hours. In a certain theoretical models, automatic obfuscation of programs is not possible. All this provides some evidence that programmers wishing to create secure software need to be involved more deeply with protection.

Programmers need to involve themselves in the protection process from the beginning. A programmer needs to flag which variables and computations thereof that need be protected and indicate, whenever possible, degree of protection sought in some manner. The compiler then may pool these flagged portions with some variables it generates, obfuscates and verifies common data types and operation. One of the goals is to make the accesses to the data types leak very little information unless the attacker observes for a significant amount of time across many local sections of the code as it executes. Tampering a variable without proper information will lead to inconsistent or incorrect data or results. The user may also flag variables (e.g. a return address) as to be tamper evident when it will be appended with a randomized check sum akin to a cryptographic check sum; this if tampered with high probability it will be detected. OTL both provides protection tools and makes the programmer pay special attention to security-critical code. Additionally, OTL can inject "useless" data and code, both to disguise crucial data and to deflect the cracker's attention away from sensitive data and code; such "useless" data and code can be tightly interleaved with the rest of the application, including OTL-protected parts. To maximize security, OTL can be combined with other techniques we implemented, such as oblivious hashing, code-integrity checks, piecewise code encryption, anti-debugging, and others.

Software obfuscation is a widely-used method for software vendors to thwart illegitimate attempts at reverse engineering their products. Past efforts have focused mostly on code obfuscation, with data left largely in the clear. The tools available for hiding and protecting critical data invariably follow the decrypt-use-encrypt paradigm, and are generally used manually or semi-automatically by developers after the software is written. The following example, Sample 1 shows an example of using such a system. It shows a piece of code that manages a free-trial period. Every time this code is invoked, it checks a global variable iTimeLeft; if its value is zero, the code will ask the user to register the software.

SAMPLE 1

A simple sample code to manage free-trial period.

```
extern int32         iTimeLeft;
bool                 bTimeToRegister;
bTimeToRegister = iTimeLeft < 0;
if (bTimeToRegister) {
    // ask the user to register
}
iTimeLeft - - -;
```

Sample 2 shows the changes from applying a typical decrypt-use-encrypt method. First, the key variable, iTimeLeft, is stored in its encrypted (and expanded) form as a 64-bit integer. A macro is used to decrypt the 64-bit data into 32-bit clear text. The clear-text time counter is then checked and decremented before it is re-encrypted and stored away.

SAMPLE 2

The traditional decrypt-use-encrypt approach.

```
extern int64         iTimeLeft;
int32                iTemp;
bool                 bTimeToRegister;
iTemp = DECRYPT_AND_CHECK_MAC_INT32
    (iTimeLeft, MY_KEY) ;
bTimeToRegister = iTimeLeft < 0;
if (bTimeToRegister) {
    // ask the user to register
}
iTimeLeft - - -;
```

The decrypt-use-encrypt approach has two weaknesses. First, the protected variables appear in plaintext between the decryption and encryption stages. An attacker can discover what the program is doing by setting appropriate breakpoints and checking register contents. Though DRM systems often employ some form of anti-debugging, such measures historically have been easy tnot so hard to defeat; also, powerful debuggers, simulators, and in-circuit emulators can render the entire system at the attacker's disposal.

Second, data security tends to be applied as an afterthought; the developers explicitly insert macros or library function calls. There is no guarantee that accesses to secure data are always bracketed by decryption and encryption macros. As a matter of fact, bugs have arisen because developers forgot to apply decryption macros before manipulating the secure data. Due to its manual nature, decrypt-use-encrypt processing is applied to only a few key variables in a program.

A systematic approach is needed to data hiding and protection, which can meet the following criteria:

A non-intrusive methodology for annotating the software during its development cycle so that it can be adopted easily by developers and employed efficiently. The underlying mechanisms & algorithms of supporting the indicated protection can be developed independently in a modular way and made available for use as a programming language tools and transformations (e.g. compilers.)

Protected data objects are seldom manipulated in cleartext form.

Breaking data protection for one data object does not lead to cracking of other protected objects.

There are no automated tools to reverse engineer our data protection mechanisms. In particular traditional program flow analysis tools should not be able to discover the details of the exact protection mechanism used in a given copy of the protected application. The attacker has to work through the entire program laboriously (many times) to uncover the original data objects.

Oblivious (i.e., unobvious and well-disguised) comparison of data (e.g. Is A=B?) and oblivious return of results (e.g. If A=B return the result in a probabilistic fashion in a variable C; if C does not have the right properties it will corrupt some protected data variable and lead to incorrect operation).

SUMMARY

The present invention relates to a method, apparatus, and article of manufacture to provide secure variables within programming modules and more particularly to a system, method and article of manufacture for providing secure and opaque type libraries to automatically provide secure variables within a programming module.

One aspect of the present invention is a system for providing secure and opaque type libraries to automatically provide secure variables within a programming module. The system includes an OTL selection module, an OTL substitution module, an OTL type library database, a compiler module; and a linker module to create an executable processing module. The OTL selection module randomly selects or generates one of the possible variable obfuscation functions for each declared secure variable. The OTL substitution module substitutes the separate instance of the selected variable obfuscation function for every reference to the declared secure variable. The OTL type library database receives queries from the OTL selection module a database to identify possible variable obfuscation functions applicable for the variable type corresponding to the declared secure variables.

Another aspect of the present invention is a method, and corresponding computer data product for providing secure and opaque type libraries to automatically provide secure variables within a programming module. The method identifies secure variable declaration statements within a source code module, queries a database for identification of possible variable obfuscation functions applicable for the variable type corresponding to the secure variable declaration statement, randomly selects or generates one of the possible variable obfuscation functions returned in response to the database query, creates a separate instance of the selected variable obfuscation function corresponding to the secure variable declaration, and substitutes the separate instance of the selected variable obfuscation function for every reference to the declared secure variable. The variable declaration statement comprises a variable type declaration used to select the variable obfuscation function.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION

The present invention relates to a system, method and article of manufacture for providing secure and opaque type libraries to automatically provide secure variables within a programming module.

Figure 1:
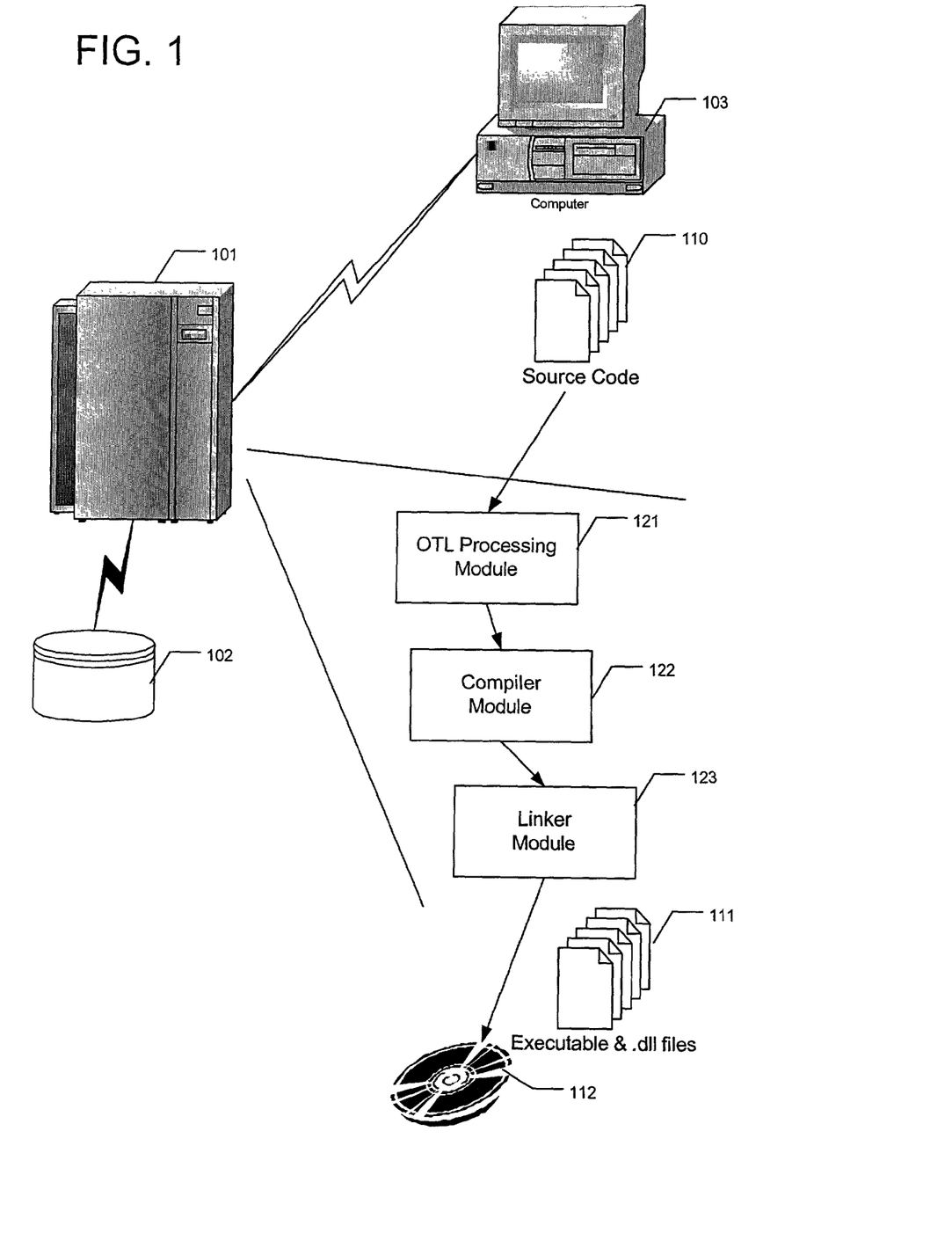
FIG. 1 illustrates a computing system to create secure variables using Opaque Type Libraries according to one embodiment of the present invention.

FIG. 1 illustrates a computing system to create secure variables using Opaque Type Libraries (OTL) according to one embodiment of the present invention. An OTL is a collection of data types (e.g., C++ classes). Each data type directs the compiler to generate an individualized implementation for each protected data object. One can loosely think of OTL as MFC for data security. By using OTL, the developers conveniently specify which data objects to protect during the design and coding stages. This seemingly simple step has the immediate benefit of involving the developers in thinking about data protection from Day One of software design. This simple step is illustrated by the following example, Sample 3. It shows how the trial period test code is easily transformed: The developer needed only to change the type declaration for iTimeLeft from int32 to SInt32. In addition, the result of testing iTimeLeft is assigned to a secure Boolean bTimeToRegister. The use of a secure Boolean variable in the IF statement instructs the compiler to obfuscate and protect the branch.

SAMPLE 3

The OTL approach to data protection and obfuscation.

```
extern SInt32          iTimeLeft;
SBool                  bTimeToRegister;
bTimeToRegister = iTimeLeft <= 0;
if (bTimeToRegister) {
    // fire up the registration stuff
    ...
}
```

The bulk of the OTL system resides in or used by the compiler (or OTL backend). It can be plugged into the compilation pipeline to transform the intermediate representation or byte code. Its main task is to generate individualized representations and implementations for OTL objects. This is achieved by developing a library of meta-implementations of OTL data types that can be parameterized to yield diverse-looking implementations of OTL objects. For example, an integer with a small range can be implemented using homomorphism, graph properties, and bit count in a vector. If the OTL backend chooses homomorphisms as a meta-implementation, it still has the freedom to choose the exact homomorphism from a set of many, using a random key. In general, integer-value properties about any data structures can be used to represent integers. Data encryption can simply be done with homomorphism, in which addition and subtraction take the form of multiplication and division, respectively.

The meta-implementations in the OTL backend allow manipulation of protected objects in their obfuscated form. For example, a meta-implementation of the OTL character string simply encrypts the string using a symmetric cipher. In order to append another OTL string to this one, it is necessary only to change the encryption of the other string, character-by-character in an arbitrary order.

In one embodiment, OTL utilizes a library of secure 32-bit and 64-bit integers with addition, multiplication, and comparison operations, secure strings with concatenation and character search operations, and secure Booleans. The compiler analysis of operations used on a given OTL variable is crucial for achieving strong protection. For example, blindly applying Homomorphic Encryption to protect OTL integers is insufficient to hide the true value of the data. If multiplication, addition, subtraction, and comparison operators are provided, the attacker can use binary search to figure out a true value of an OTL integer. However this may not be possible to efficiently carry out this attack, if no comparison operator is given. Thus supporting a full set of operations needs care and switching between different types of homomorphisms in a hidden manner. Therefore, some sophistication is required to generate obfuscated and individualized operators that are tailored to each protected variable. For example, only addition operators are generated for offset variables, increment and test-for-equality operators for the loop counters, etc.

A salient feature of OTL is complete obfuscation of operations on protected data. In the above example, the comparison operator (<=) and the decrement operator (—) on the SInt32 variable iTimeLeft work directly in the obfuscated domain. In addition, the result of the comparison operator will be represented as an obfuscated Boolean value, for which many values map to True and many others map to False. Representations of Booleans can vary with time and program state (a.k.a. Time-Varying OTL), so that a value representing True at one point may represent False later, and vice versa. Original, plaintext data values never or seldom appear in the program's execution.

An important application of Time-Varying OTL is authenticated function call. In this model, a function can be annotated as call-by-authentication; parameters passed to this function, as well as the return value, are protected using Time-Varying OTL, which varies from machine to machine and from time to time. A virus that is injected into a remote client machine will have no easy way to figure out the encoding scheme used at the time and hence is prevented from using OTL-protected internal functions to cause damages.

The partition of our OTL system into a relatively static type interface and compile-time instantiation stage offers two benefits. First, the developers can work with a stable interface and worry less about keeping up with upgrades. Second, the OTL compiler component is free to choose (using a random key) whichever meta-implementation is available for a given OTL type and individualize the type instantiation on a per-object basis.

OTL is a language-level concept. OTL is platform independent, whereas most software protection tools to-date are tied to a particular machine platform. Unlike existing software protection tools, type safety in an OTL-enabled program is automatically guaranteed by the compiler; thus, many program bugs can be avoided. (We should point out that with explicit decrypt-encrypt macros, one can also build a data-flow analysis tool to enforce the decrypt-use-encrypt rule. Such a tool, however, is unavailable as of yet.)

OTL is tightly integrated into the programming environment either through a rich class hierarchy in the model of MFC and ATL, or by augmented C/C++/C# languages and compilers. It is relatively straightforward for developers to specify variables and static constants that need be protected. A compile-time switch (or macro definition) enables/disables OTL. This allows the same program to be compiled with or without data obfuscation, making it easier to debug the application code.

Data obfuscation alone is typically insufficient to protect software. Very often, our ultimate goal is to forestall illegitimate tampering of the software either by pirates or by agents trying to attack the security of computer systems by exploiting loopholes to access and modify data (e.g return addresses) to usurp control of the system and its resources. Tampering often takes one of two forms (or both): patching the software binary and altering the data. Data obfuscation makes it difficult for the attacker to guess the proper values for OTL-protected data objects within the program. Furthermore, each OTL object has built-in mechanism for integrity verification, which makes it even harder for the attacker to alter data: even if the attacker knows how to exactly to modify a given variable to effect his attack, he or she may not know how to exactly represent it without suitable keys.

Unable to patch program data, the attacker may attempt to patch the binary to remove some critical code from the execution path. Since current instruction set architectures use binary conditions to trigger branches, an OTL Boolean object will eventually be resolved into a single bit to be used by machine code. This will be an attractive place for the attacker to alter the machine registers to bypass a critical code segment. Although code-integrity verification and Oblivious Hashing are effective ways to detect and thwart such attacks, our OTL system can offer additional and new ways of protection in conjunction with these methods. For example, OTL offers a good way of hiding the variables in a way that it is not clear that they are being protected. Another issue is that one can automatically generate a number of homomorphic encryption schemes and switch between them as needed in a hidden fashion. For example, one may employ one-time-pad encryptions during comparison and use encryptions based on addition and multiplication for checking for equality and switch between the two; One may use a program analysis tool one can automatically effect this. A number of homomorphic encryption systems have been conceived in the cryptographic literature but here we do not necessarily need such ciphers of high strength. It is known how (by carefully composing elementary arithmetic operations with random constants) to generate authentication tag generation mechanisms (reversible and non reversible) randomly and they may be used here to automatically choose encryption and authentication mechanisms. One of our ideas is to transform an OTL Boolean object that serves as a branch condition into a number of objects, which are further checked by code in both targets of the branch. There are exponential number of ways to obfuscate a Boolean variable and branch conditions. OTL allows compiler-time individualization of branch protection that is transparent to developers.

Figure 2:
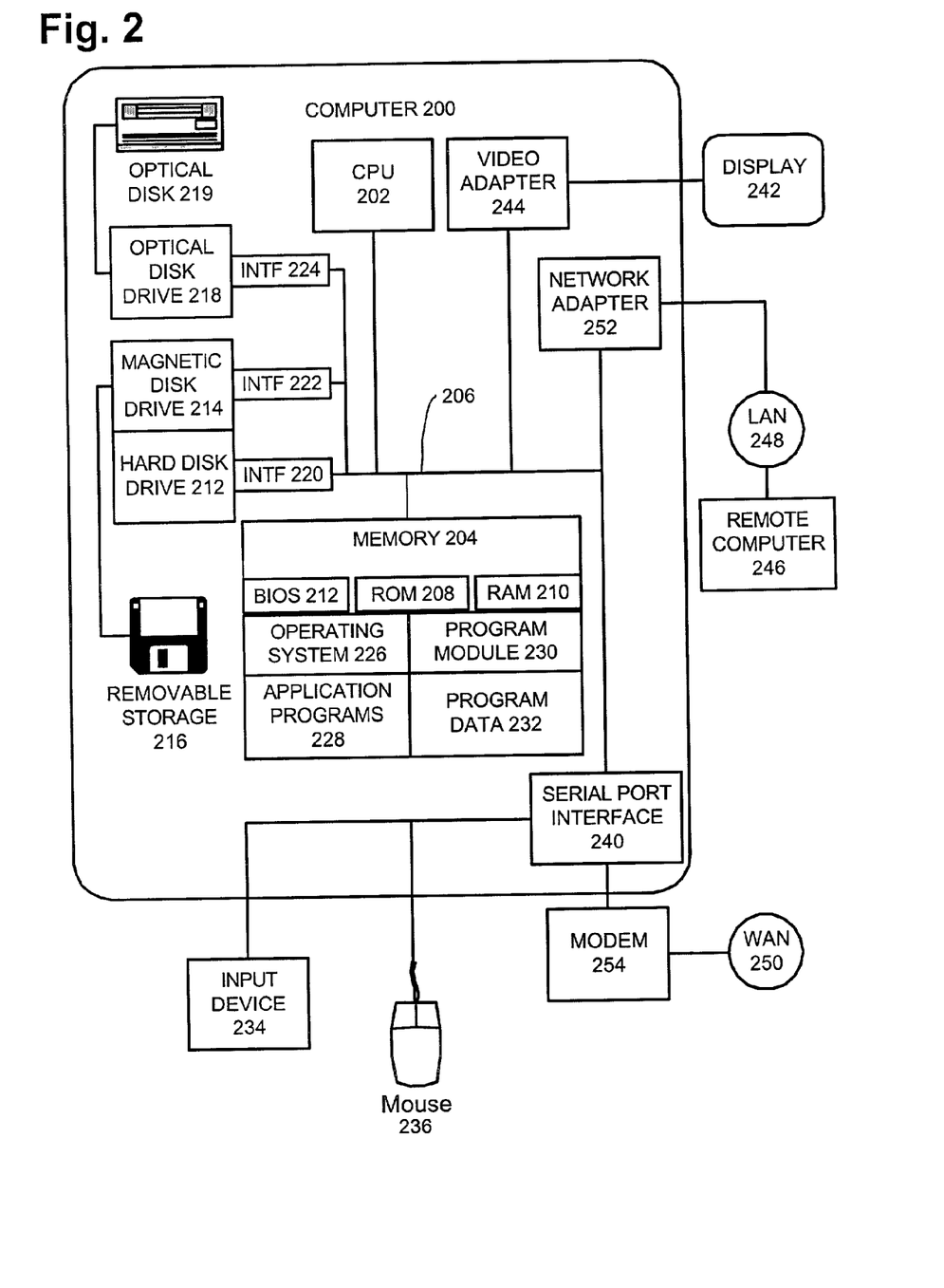
FIG. 2 illustrates an exemplary computing system that may be used to support various computing system that are part of example embodiments of the present invention.

With reference to FIG. 2, an exemplary computing system for embodiments of the invention includes a general purpose computing device in the form of a conventional computer system 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the computer system 200, is stored in ROM 208.

The computer system 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the computer system 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the computer system 300 through input devices such as a keyboard 234 and mouse 236 or other pointing device. Examples of other input devices may include a microphone, joystick, game pad, satellite dish, and scanner. For hand-held devices and tablet PC devices, electronic pen input devices may also be used. These and other input devices are often connected to the processing unit 202 through a serial port interface 240 that is coupled to the system bus 206. Nevertheless, these input devices also may be connected by other interfaces, such as a parallel port, game port, or a universal serial bus (USB). A monitor 242 or other type of display device is also connected to the system bus 206 via an interface, such as a video adapter 244. In addition to the monitor 242, computer systems typically include other peripheral output devices (not shown), such as speakers and printers.

The computer system 200 may operate in a networked environment using logical connections to one or more remote computers, such as a remote computer 246. The remote computer 246 may be a computer system, a server, a router, a network PC, a peer device or other common network node, and typically includes many or all of the elements described above relative to the computer system 200. The network connections include a local area network (LAN) 248 and a wide area network (WAN) 250. Such networking environments are commonplace in offices, enterprise-wide computer networks, intranets, and the Internet.

When used in a LAN networking environment, the computer system 200 is connected to the local network 248 through a network interface or adapter 252. When used in a WAN networking environment, the computer system 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the computer system 200, or portions thereof, may be stored in the remote memory storage device. It will be appreciated that the network connections shown are exemplary, and other means of establishing a communication link between the computers may be used.

Figure 3:
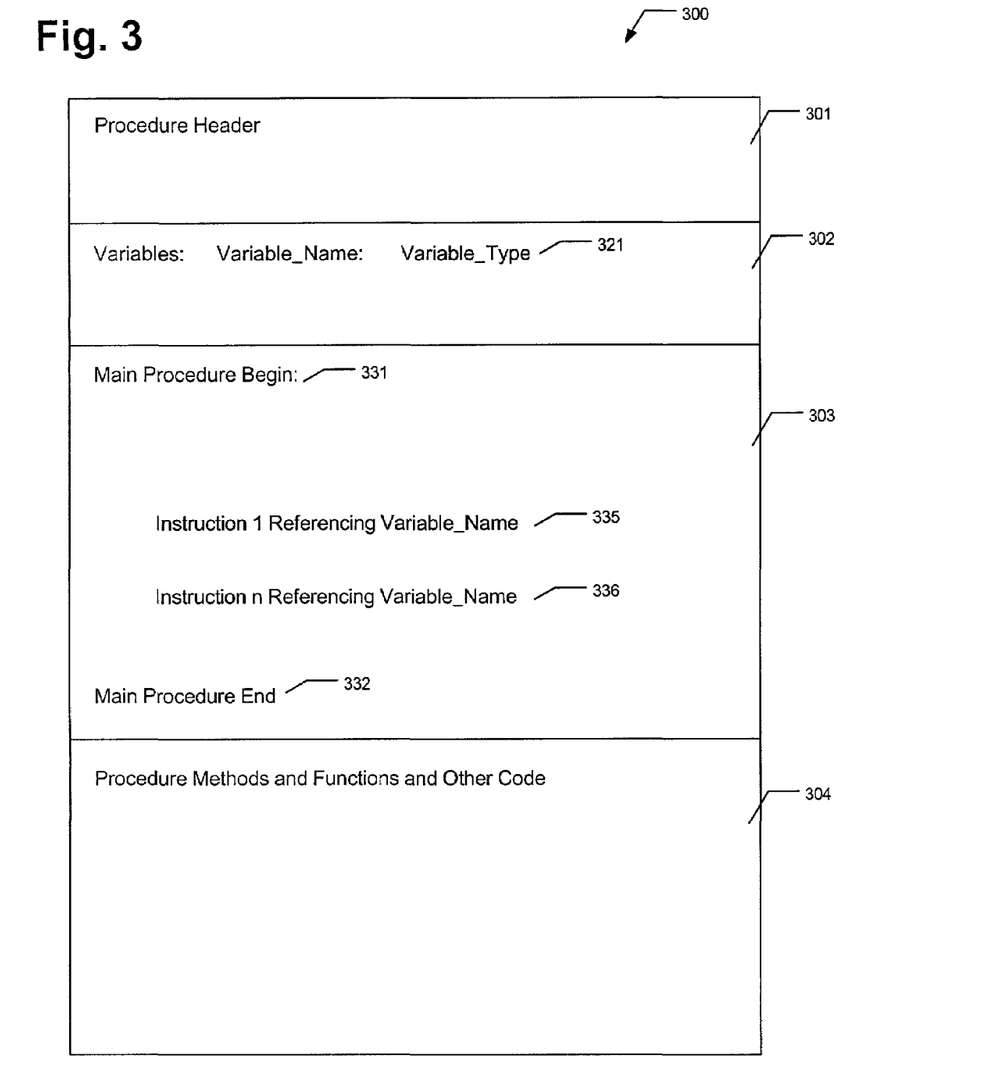
FIG. 3 illustrates a block diagram for a program module using OTL variables according to an embodiment of the present invention.

FIG. 3 illustrates a block diagram for a program module using OTL variables according to an embodiment of the present invention. For several examples discussed below, the structure of a programming module illustrated in FIG. 3 is utilized. In the example, a programming module 300 consists of a set of sections that include a header 301, a variable declaration section 302, a main procedure section 303, and a methods and functions section 304. The header section 301 may be used to provide needed declarations and metadata needed to specify the compile-time and run-time parameters of the programming module once an executable module is created from a source code file. The variable declaration section 302 allows for the declaration of any variables, especially secure variable that may utilize OTL libraries according to the present invention. The main procedure module 303 provides the set of instructions that are performed when the programming module is run. Within the main procedure module, various instructions 335-336 may reference variables declared in the variable declaration section. Finally, the methods and functions section 304 provides any additional set of functions and methods that may be utilized by the instructions within the main procedure module 303 as defined by a programmer.

Figure 4:
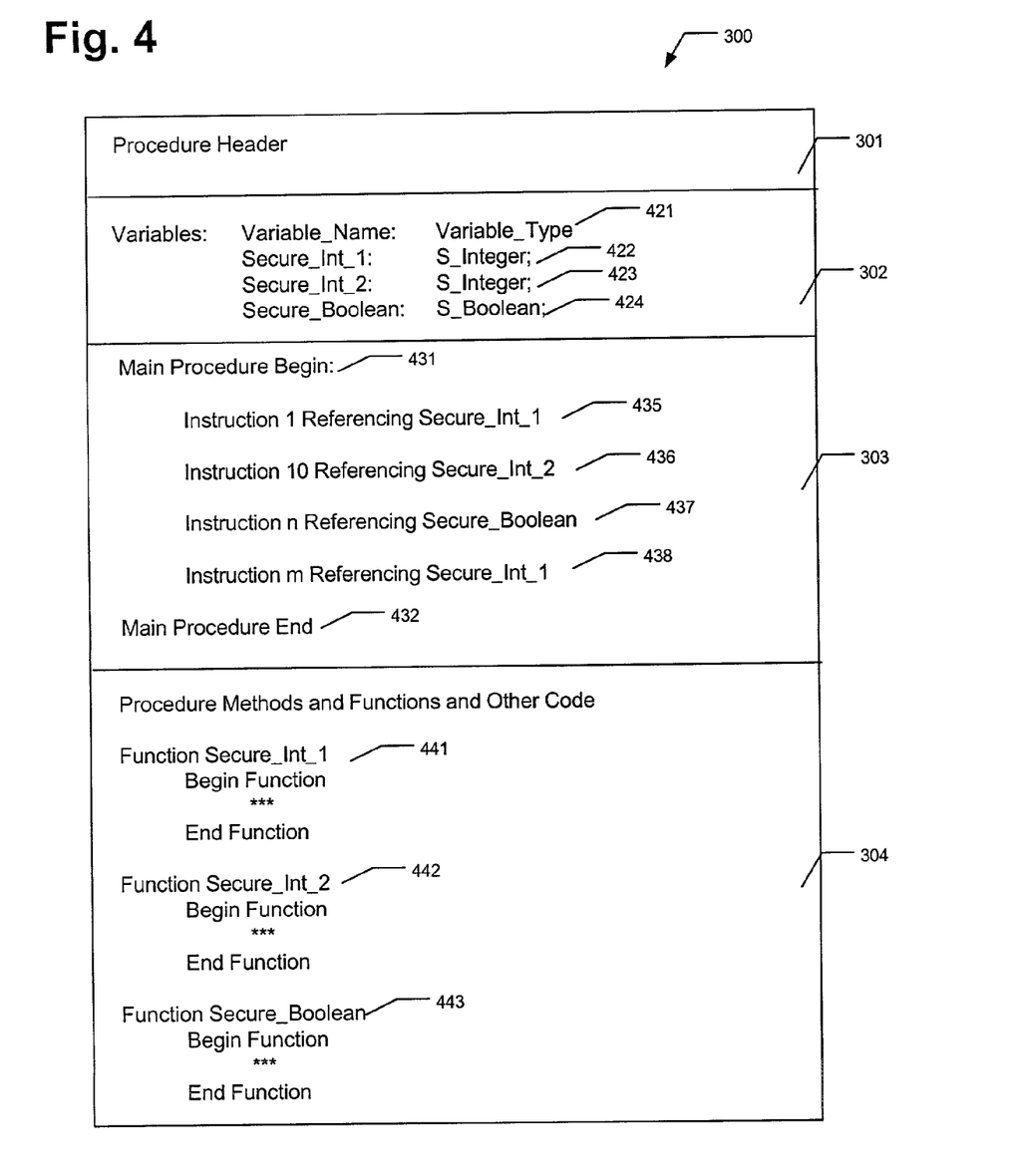
FIG. 4 illustrates a block diagram for a program module using OTL variables calling procedures according to an embodiment of the present invention.

FIG. 4 illustrates a block diagram for a program module using OTL variables calling procedures according to an embodiment of the present invention. As noted above, the example in FIG. 4 contains the four sections of a programming module discussed within FIG. 3 above. In this particular example, a set of three secure variables are declared in addition to any other declared variables. These secure variables include two secure integers, Secure_Int_1 422 and Secure_Int_2 423, and a secure Boolean variable, Secure_Boolean 424. The OTL processing of this program module 300 will create a separate instance of a function that will obfuscate the contents of these secure variables. For any given type of variable, i.e., integer, float, character, Boolean, etc., a set of possible functions may be included within a library for use at compile time. Alternately, these functions may be generated on-the-fly during compile time.

In this example, each of the two secure integers will cause a separate instance of a function to be created. These functions may be entirely different operations to obfuscate an integer. For example, Secure_Int_1 may add a random offset to the run-time value of the variable where Secure_Int_2 may XOR a random bit pattern with its runtime value. For both of these instances, a separate random value parameter may also be selected for each variable to further obfuscate the data contained therein.

The secure Boolean variable, Secure_Boolean 424, may use an entirely different set of functions to obfuscate the contents of the variable as to prevent hackers from discovering its contents at runtime. One skilled in the art will recognize that any number of possible obfuscation functions may exist for use with various variable types without deviating from the spirit and scope of the present invention as recited in the attached claims. In addition, the complexity of the obfuscation function may be varied as a programmer decides how much effort should be applied to obfuscate a particular variable in light of the processing overhead that may be imposed with increasing complex obfuscation procedures. However, hackers may be hindered in their ability to decipher the operation of obfuscated variables since each secure variable is treated independently and may use different obfuscation functions and obfuscation parameters.

Within the main procedure section 303, various instructions 435-438 will reference the secure variables 422-424 declared above. In one embodiment, these variables may utilize references to secure functions 441-443 to process the secure variables from a secure state to a plain text state for use in the main procedure section 303. As discussed below, this embodiment may present needless creation of a plain text version of the secure variable that may be observed by hackers at run time.

Figure 5:
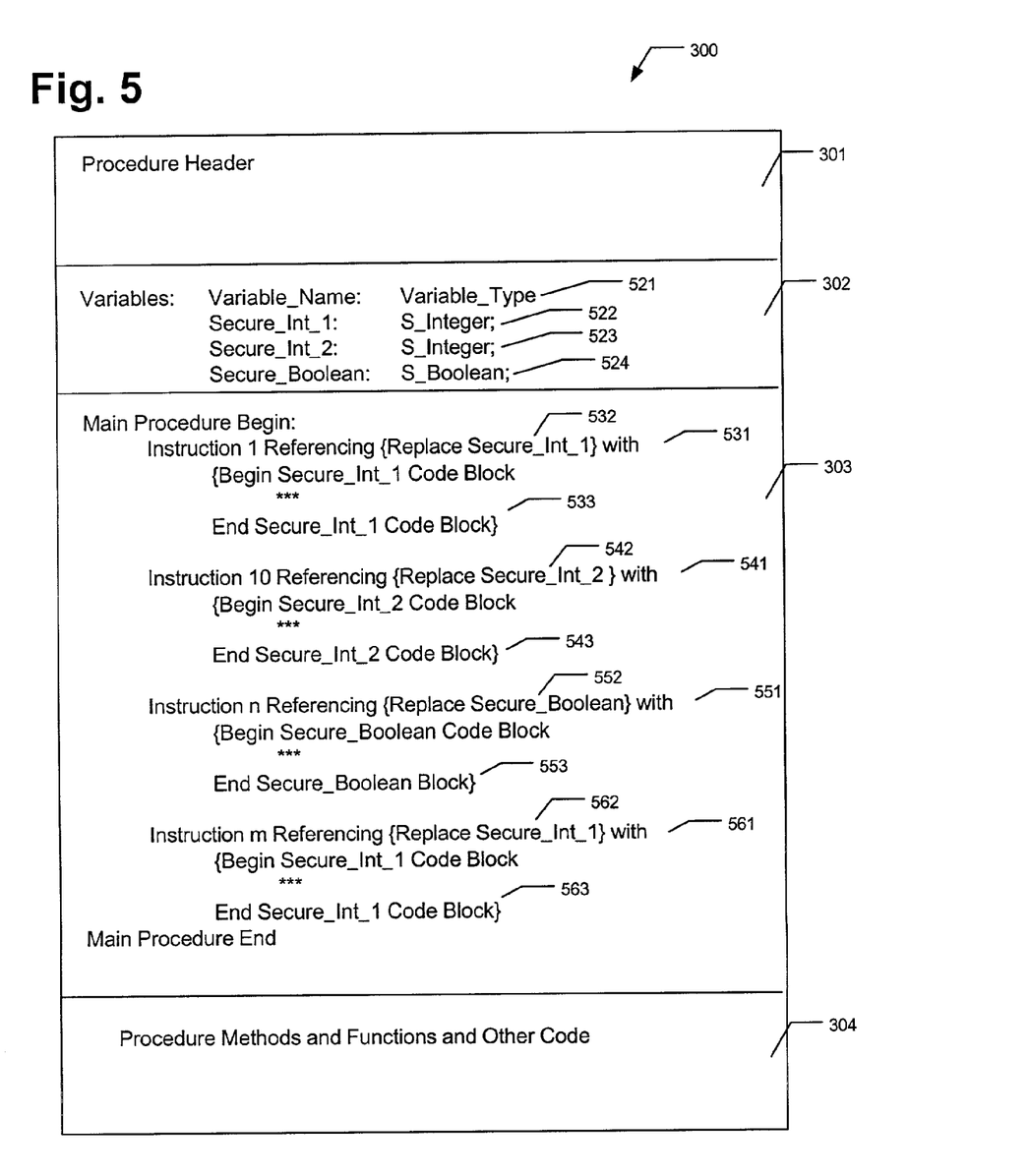
FIG. 5 illustrates a block diagram for a program module using OTL variables in which OTL procedures are substituted into the programming module according to an embodiment of the present invention.

FIG. 5 illustrates a block diagram for a program module using OTL variables in which OTL procedures are substituted into the programming module according to an embodiment of the present invention. Rather than utilizing the secure functions of FIG. 4, another embodiment of the present invention will substitute the code for the secure function directly into the in-line code of the main procedure section 303. For example, Secure_Int_1 522 is referenced within Instruction 1 531 and within Instruction m 561. Similarly, Secure_Int_2 523 is referenced within Instruction 10 541 and Secure_Boolean 524 is referenced within Instruction n 551.

When the source code is processed as part of a compilation of the processing module 300, the secure variable declaration statements 522-524 will cause instances of the secure functions to be generated as discussed above. For each variable type, a particular instance of an obfuscation function is randomly selected or generated, as are any parameters utilized by the selected function. When the main procedure section 303 is processed, these instances of obfuscation functions are substituted into the particular instructions that reference a particular secure variable. For example, Both Instruction 1 531 and Instruction m 561 contain a reference to Secure_Int_1 522. When these instructions are processed, the particular references to Secure_Int1 532, 562 are replaced with a copy of the instance of the obfuscation function 533, 563 created for use in processing references to Secure_Int_1 522. Unlike the example in FIG. 4, separate insertions of the in-line code for this obfuscation function are needed; however the in-line substitution will eliminate the call operation to the function itself to further obfuscate the variable to hackers. Similar substitutions of function code 543, 553 are made for references 542, 552 to other secure variables 523, 524 used in the main procedure section 303.

Figure 6:
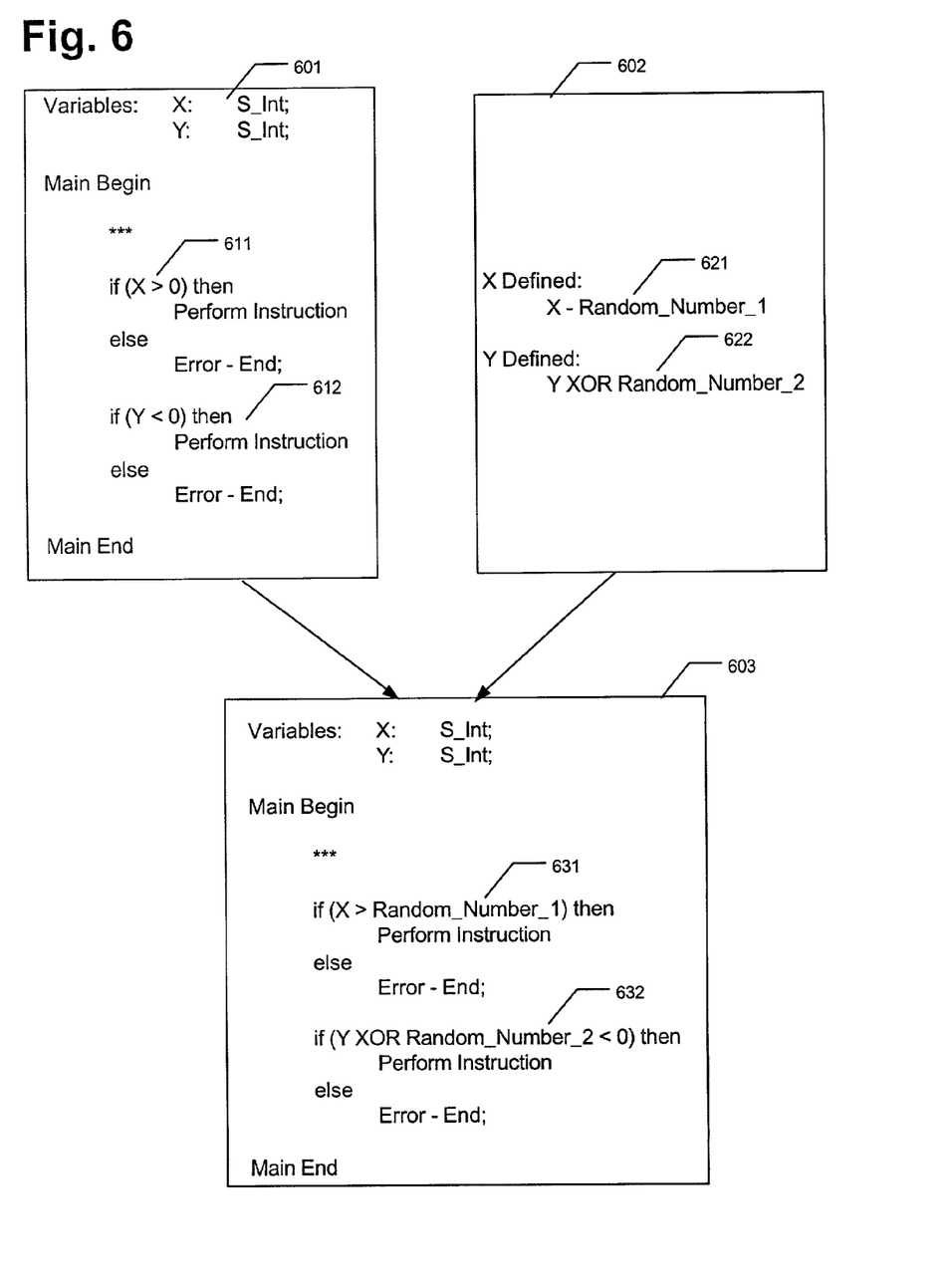
FIG. 6 illustrates a block diagram for a program module using OTL variables in which OTL procedures are substituted into the secure variable references according to an embodiment of the present invention.

FIG. 6 illustrates a block diagram for a program module using OTL variables in which OTL procedures are substituted into the secure variable references according to an embodiment of the present invention. One possible additional advantage of using the substitution of code discussed above is that various operations to obfuscate contents of variables may be combined with other operations specified by a programmer. FIG. 6 illustrates an example of two such substitutions for secure integers X and Y in the source code 601 created by a programmer. In this example, the programmer specifies a test operation 611 on X>0 and specifies a similar operation 612 Y<0 in his or her code 601. Within the two obfuscation functions specified in a particular instance of an OTL library 602, X is defined as X minus a Random Number 1 621. Similarly, Y is defined in a particular instance 622 of the library as Y XOR Random Number 2. When these functions are substituted into the user's code 601, the user specified instructions may be optimized in the form of X>Random Number 1 631. As such, the plain text version of X is never actually created in the runtime version of the code generated pursuant to the present invention. Thus, a hacker may never be in a position to decipher the value of X as well and its operation and use.

Figure 7:
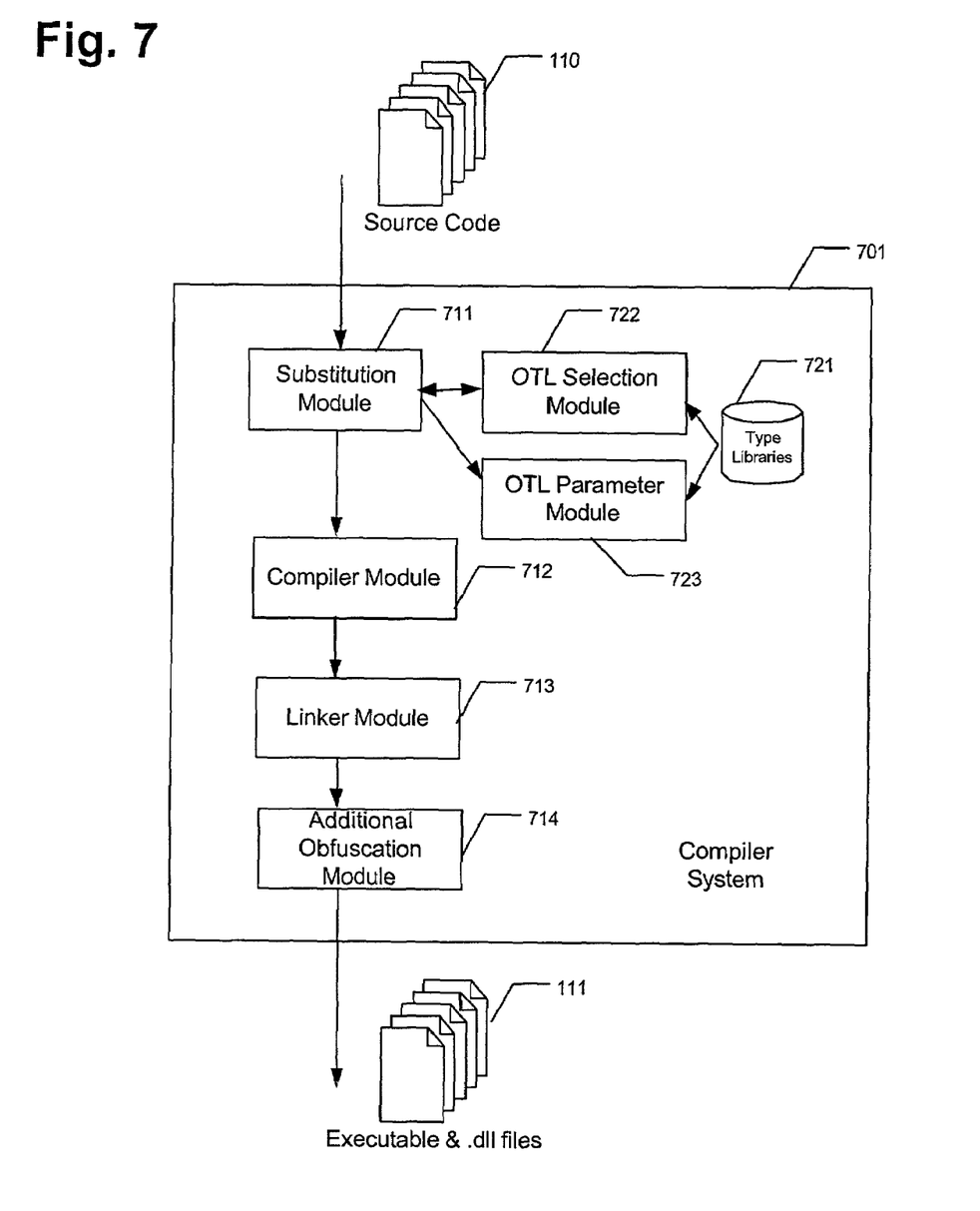
FIG. 7 illustrates a processing system for generating executable program modules using OTL modules according to one possible embodiment of the present invention.

FIG. 7 illustrates a processing system for generating executable program modules using OTL modules according to one possible embodiment of the present invention. In a preferred embodiment, the OTL processing will be included within a compiler system 701. This compiler system 701 accepts source code files 110 to generate executable files (e.g., EXEs and DLLs). The compiler system 701 includes a substitution module 711, a compiler module 712, a linker module 713 and possibly a set of additional obfuscation modules 714. In addition, the substitution module uses an OTL selection module 722 and an OTL parameter module 723 that both utilize a type library database 721.

The substitution module 711 generates the obfuscation function code for each declared secure variable using the OTL selection module 722 and the OTL parameter module 723. The OTL selection module 722 selects or builds on-the-fly a particular obfuscation function for each declared secure variable based upon the type of secure variable and any input selection parameters. The OTL parameter module 723 generates any random parameters needed by the selected obfuscation function for each declared secure variable.

The compiler module 712 processes the source code following the OTL code substitution operation to generate object code that is combined with other executable modules by the linker module 713 to generate an executable processing module.

The set of additional obfuscation modules 714 implements additional obfuscation operations that may be utilized to make the operation of the processing module more secure. Past experience shows that attackers can often bypass the software protection mechanisms by snooping on the interaction between software and the underlying operating system. In particular, the arguments passed in Windows API calls are plaintext. An attacker has little difficulty intercepting API calls and changing their arguments arbitrarily. An obvious cure of this problem is to push data obfuscation deep into the OS. If the data is temporarily de-obfuscated right before its use—for example, an encrypted song is decrypted right before it's sent to the sound driver, or an encrypted file name is decrypted inside the file system module—the attacker will have much more difficulty in intercepting and modifying critical plaintext data.

No matter how much data obfuscation is put into a conventional PC operating system, it is still possible for attackers to reverse engineer the entire OS. Hardware-assisted secure PC is one way to forestall any software-based attacks. The Trusted Windows (TW) Initiative within Microsoft offers an excellent opportunity for data protection. On the TW platform, the trusted mini-OS is protected by hardware mechanisms that disallow any users from examining the memory content of the mini-OS and from debugging it by pure software means. Due to resource constraints and engineering complexity, the protection is limited only to the mini-OS; the bulk of the application software still runs in the untrusted domain. This problem can be alleviated by using OTL, as described in the following.

Figure 8A:
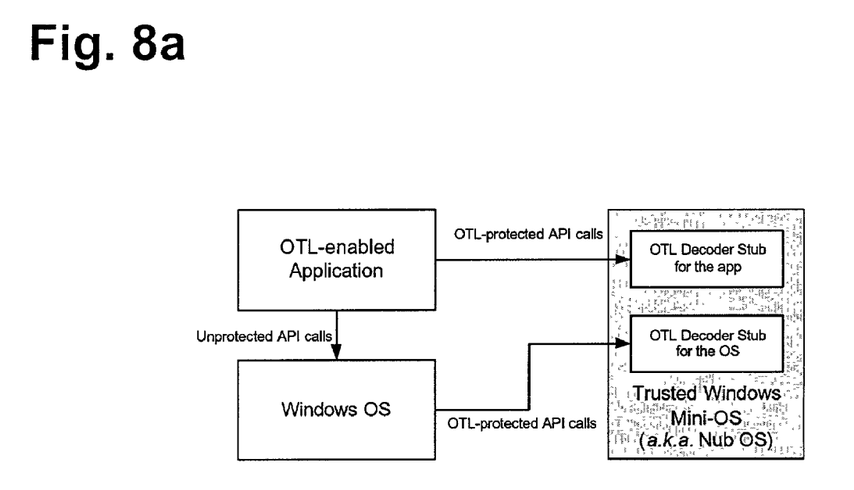
FIGS. 8a and b Illustrate additional obfuscation processing that may be included within an OTL process according to yet another example embodiment of the present invention.

A TW application written with OTL is compiled into two components: the application binary and an OTL object decoder (OTL decoder) as shown in FIG. 8a. The OTL decoder contains necessary information for someone to de-obfuscate the OTL objects for this application. It is encrypted with the public key for the Trusted Windows PC that this application is licensed to. When the application is loaded on the TW PC, the corresponding OTL decoder is loaded into the mini-OS. All subsequent communication between the application and the mini-OS uses the OTL objects in their obfuscated form. We thus eliminate a common vulnerability present in current PC OS.

The use of OTL in securing API calls comes at no extra cost to the developers. All they need to do is to pass a SInt32 (or SBool, etc.) in the API call instead of int32 (or BOOL, etc.) The OTL decoder, to be run in the mini-OS, can be automatically generated by the OTL compiler middleware.

Figure 8B:
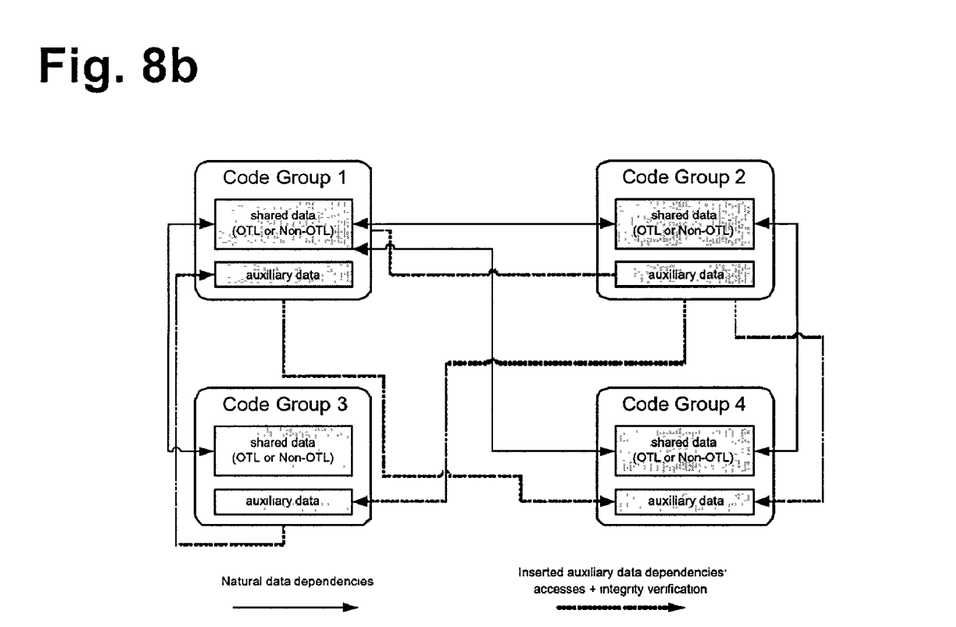

To protect data-access patterns in a program, we propose to inject auxiliary data and fake data accesses to both program data and auxiliary data. The injection is done by the OTL compiler. We partition the software into many code groups, each containing some global data, either OTL-based or non-OTL, shared among some groups. By inserting accesses to shared data and to auxiliary data in other code groups, artificial dependencies may be created among code groups. These extra data accesses are not to be deemed extraneous by simple data analysis tools. The result is a piece of software whose various components make seemingly random accesses to the heap. Furthermore, a traditional tree-like data dependency among the code groups may look like a complete graph as illustrated in FIG. 8b.

Figure 9:
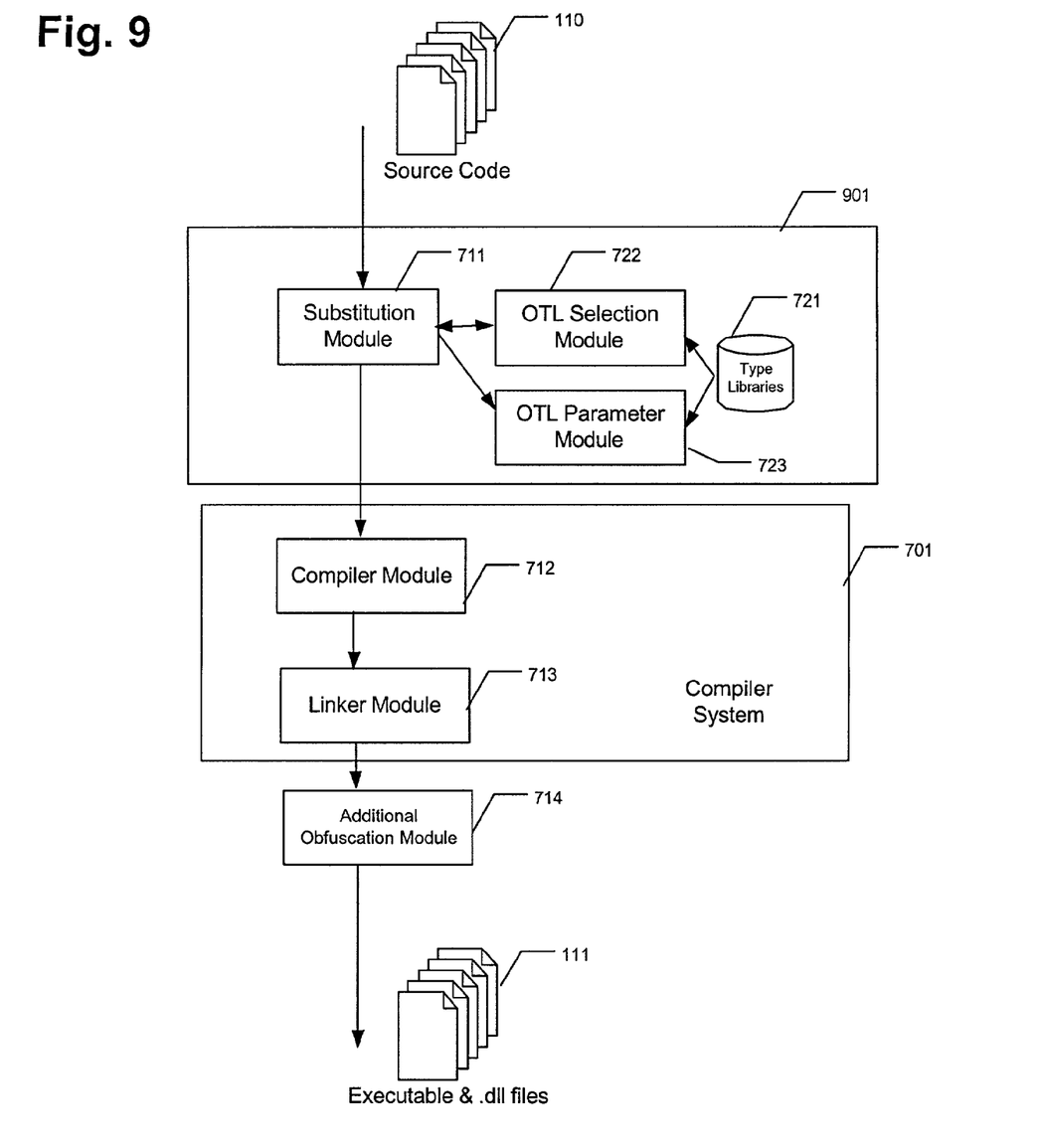
FIG. 9 illustrates a processing system for generating executable program modules using OTL modules according to another possible embodiment of the present invention.

FIG. 9 illustrates a processing system for generating executable program modules using OTL modules according to another possible embodiment of the present invention. In a second embodiment, the OTL processing of the source code 110 occurs within a separate pre-pre-processing module 901 where the output of the pre-processor is passed into the compiler system 701. In such an embodiment, the operations of the pre-processor 901 and the compiler 701 are identical to the processing discussed above; however the OTL pre-processor 901 may be used with existing compiler systems without requiring the modification of the compiler itself. Such an arrangement may require additional data storage as a new set of source code is created. However, the possible use of the OTL system with existing compilers may justify the added storage and overhead requirements of such an embodiment.

Figure 10:
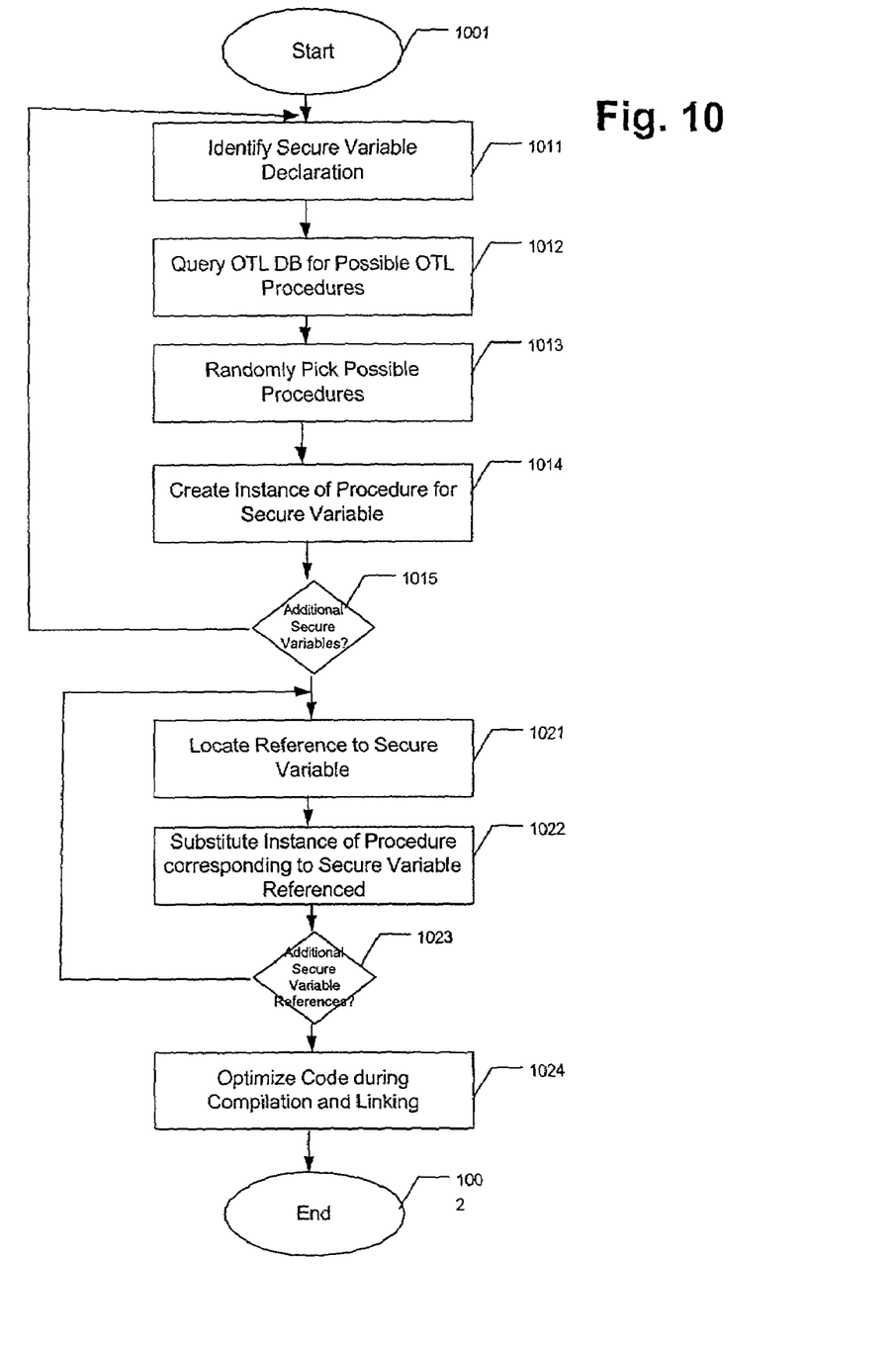
FIG. 10 illustrates an operational flow for generating executable program modules using OTL modules according to yet another example embodiment of the present invention.

FIG. 10 illustrates an operational flow for generating executable program modules using OTL modules according to yet another example embodiment of the present invention. The processing begins 1001 and the input source code is processed by module 1011 to identify a secure variable declaration. Once a secure variable declaration is found, module 1012 queries an OTL database for possible OTL procedures for use an a instance of the variable. The query may return either a pre-stored procedure or one generated on the fly. The possible procedures returned by the query will depend upon the type of secure variable referenced in the declaration statement.

From the query results, module 1013 randomly selects or generates a single procedure for use in this particular instance of a declared secure variable. Module 1014 then creates an instance for this declared secure variable and defines any random parameters that may be needed by the procedure.

Test module 1015 determines if any additional secure variables exist within the source code. If additional secure variable declarations are found the processing returns to module 1011 to process the next secure variable declaration. If test module 1015 determines no additional secure variables are to be processed, the processing continues with module 1021 that locates the next reference to a declared secure variable in the source code.

When module 1021 finds a reference, module 1022 substitutes the previously created instance of the obfuscation function for the referenced secure variable into the source code. Test module 1023 determines if any additional secure variables references exist within the source code. If additional secure variable references are found the processing returns to module 1021 to process the next secure variable reference. If test module 10223 determines no additional secure variables references are to be processed, the processing continues with module 1024 to optimize, compile, link and further obfuscate the variables as discussed above. Once the executable processing module is created, the processing ends 1002.

FIG. 2 illustrates an example of a suitable operating environment 200 in which the invention may be implemented. The operating environment is only one example of a suitable operating environment 200 and is not intended to suggest any limitation as to the scope of use or functionality of the invention. Other well known computing systems, environments, and/or configurations that may be suitable for use with the invention include, but are not limited to, personal computers, server computers, held-held or laptop devices, multiprocessor systems, microprocessor-based systems, programmable consumer electronics, network PCs, minicomputers, mainframe computers, distributed computing environments that include any of the above systems or devices, and the like.

The invention may also be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

A computing system 200 typically includes at least some form of computer readable media. Computer readable media can be any available media that can be accessed by the system 200. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer 200.

Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

While the above embodiments of the present invention describe a processing system for altering an image displayed to a user, one skilled in the art will recognize that the various computing architectures may be used to implement the present invention as recited within the attached claims. It is to be understood that other embodiments may be utilized and operational changes may be made without departing from the scope of the present invention.

The foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, computer storage medium or propagated signal containing a computer program for providing a method, apparatus, and article of manufacture for providing secure and opaque type libraries to automatically provide secure variables within a programming module.

What is claimed is:

1. A system for providing secure and opaque type libraries to automatically provide secure variables within a programming module, the system comprising:
   an OTL selection module, the OTL selection module randomly generating one of the possible variable obfuscation functions for each declared secure variable in a secure variable declaration statement of a source code module, the secure variable declaration statement comprising a variable type declaration for each declared secure variable;
   an OTL substitution module, the OTL substitution module substituting a separate instance of a selected variable obfuscation function applicable for every reference to each declared secure variable;
   an OTL type library database, the OTL type library database receiving queries from the OTL selection module and identifying possible variable obfuscation functions applicable for the variable type declaration corresponding to each declared secure variable;
   a compiler module; and
   a linker module to create an executable processing module.

2. The system according to claim 1, wherein the system further comprises an additional obfuscation processing module to apply additional obfuscation operations to protect data-memory access patterns.

3. The system according to claim 2, wherein the OTL substitution module optimizes the substituted variable obfuscation function with related instructions to further obfuscate the contents of the secure variable.

4. The system according to claim 1, wherein the variable type declaration comprises secure integers, secure floating point variables, secure boolean variables, secure characters, secure strings, secure structures, and secure versions of all other data types.

5. The system according to claim 1, wherein the OTL selection module randomly generates one of the possible variable obfuscation functions by randomly selecting a variable obfuscation function from a pre-defined library of functions.

6. The system according to claim 5, wherein the OTL selection module, the OTL substitution module, and the OTL type library database are located in a pre-processor module.

7. The system according to claim 1, wherein the OTL selection module randomly generates one of the possible variable obfuscation functions by randomly generating a variable obfuscation function using a pre-defined library of functions operators.

8. The system according to claim 1, wherein each separate instance of the selected variable obfuscation function utilizes one or more parameters.

9. The system according to claim 8, wherein the one or more parameters comprise randomly generated values.

10. A method for providing secure and opaque type libraries to automatically provide secure variables within a programming module, the method comprising:
    identifying secure variable declaration statements within a source code module, each of the secure variable declaration statements comprising a declared secure variable and a variable type declaration;
    querying a database for identification of possible variable obfuscation functions applicable for the variable type declaration corresponding to each of the secure variable declaration statements;
    randomly generating one of the possible variable obfuscation functions returned in response to the database query;
    creating a separate instance of a selected variable obfuscation function corresponding to each of the secure variable declaration statements; and
    substituting the separate instance of the selected variable obfuscation function for every reference to each declared secure variable.

11. The method according to claim 10, wherein the method further comprises optimizing the substituted variable obfuscation function with related instructions to further obfuscate the contents of the secure variable.

12. The method according to claim 11, wherein the method further comprises: compiling the source code;

linking the source code with additional processing modules; and applying additional obfuscation processing to protect data-memory access patterns.

13. The method according to claim 12, wherein the method further comprises generation and injection of "useless" but potentially tightly integrated code designed to disguise the secure variable and deflect the attacker's attention away from sensitive data and code.

14. The method according to claim 10, wherein the variable type declaration comprises secure integers, secure floating point variables, secure boolean variables, secure characters, secure strings, secure structures, and secure versions of all other data types.

15. The method according to claim 14, wherein the secure Boolean variables correspond to time-varying secure Boolean variables.

16. The method according to claim 15, wherein the time-varying secure Boolean variables are utilized to perform an authenticated function call.

17. The method according to claim 10, wherein the separate instance of a variable obfuscation functions are selected, created, and substituted into the source code in a pre-processor module.

18. The method according to claim 10, wherein the randomly generating one of the possible variable obfuscation functions randomly selects a variable obfuscation function from a pre-defined library of functions.

19. The method according to claim 10, wherein the randomly generating one of the possible variable obfuscation functions randomly generates a variable obfuscation function using a pre-defined library of functions operators.

20. A computer program data product readable by a computing system and encoding instructions implementing a method for providing secure and opaque type libraries to automatically provide secure variables within a programming module, the method comprising:

identifying secure variable declaration statements within a source code module, each of the secure variable declaration statements comprising a declared secure variable and a variable type declaration;

querying a database for identification of possible variable obfuscation functions applicable for the variable type declaration corresponding to each of the secure variable declaration statements;

randomly selecting or generating on-the-fly one of the possible variable obfuscation functions returned in response to the database query;

creating a separate instance of a selected variable obfuscation function corresponding to each of the secure variable declaration statements; and substituting the separate instance of the selected variable obfuscation function for every reference to each declared secure variable.

21. The computer program data product according to claim 20, wherein the method further comprises optimizing the substituted variable obfuscation function with related instructions to further obfuscate the contents of the secure variable.

22. The computer program data product according to claim 21, wherein the method further comprises:

compiling the source code;

linking the source code with additional processing modules; and applying additional obfuscation processing to protect data-memory access patterns.

23. The computer program data product according to claim 22, wherein the method further comprises generation and injection of "useless" but potentially tightly integrated code designed to disguise the secure variable and deflect the attacker's attention away from sensitive data and code.

24. The computer program data product according to claim 20, wherein the variable type declaration comprises secure integers, secure floating point variables, secure boolean variables, secure characters, secure strings, secure structures, and secure versions of all other data types.

25. The computer program data product according to claim 24, wherein the secure Boolean variables correspond to time-varying secure Boolean variables.

26. The computer program data product according to claim 25, wherein the time-varying secure Boolean variables are utilized to perform an authenticated function call.

27. The computer program data product according to claim 20, wherein the separate instance of a variable obfuscation functions are selected, created, and substituted into the source code in a pre-processor module.

28. The computer program data product according to claim 20, wherein the computer program data product corresponds to a computer readable storage medium.

* * * * *